United States Patent [19]

Aida et al.

[11] 3,915,982

[45] Oct. 28, 1975

[54] IMIDAZOLE DERIVATIVES AND PROCESS FOR THEIR PREPARATION

[75] Inventors: Kazuhiko Aida; Toshiaki Takagi; Hirozo Segawa; Haruo Nagai, all of Nakajyo, Japan

[73] Assignee: Kyowa Gas Chemical Industry Co., Ltd., Tokyo, Japan

[22] Filed: Jan. 28, 1974

[21] Appl. No.: 436,890

[30] Foreign Application Priority Data

Jan. 31, 1973   Japan.............................. 48-13080
Jan. 31, 1973   Japan.............................. 48-13081
Jan. 31, 1973   Japan.............................. 48-13082

[52] U.S. Cl................................ 260/309; 424/273
[51] Int. Cl.².................................... C07D 233/90
[58] Field of Search................................ 260/309

[56] References Cited
UNITED STATES PATENTS 3,808,225   4/1974   Asai.................................... 260/309

OTHER PUBLICATIONS
Synthetic Organic Chemistry, Wagner & Zook (1953) pp. 570, 675.

*Primary Examiner*—Sherman D. Winters
*Attorney, Agent, or Firm*—Sherman & Shalloway

[57] ABSTRACT

A novel alkyl 4-cyanoimidazole-5-carbamate of the formula

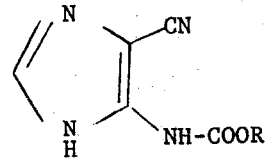

wherein R is an alkyl group,
and a process for the preparation thereof. The above compound is used for preparing 5-aminoimidazole-4-carbonitrile and 5-aminoimidazole-4-carboxamide.

25 Claims, No Drawings

IMIDAZOLE DERIVATIVES AND PROCESS FOR THEIR PREPARATION

This invention relates to imidazole derivatives. More specifically, it relates to novel alkyl 4-cyanoimidazole-5-carbamates, a process for preparing them, and also to a process for preparing 5-aminoimidazole-4-carbonitrile and 5-aminoimidazole-4-carboxamide from these carbamates.

The present invention provides novel alkyl 4-cyanimidazole-5-carbamates of the following formula

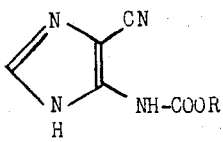

wherein R is an alkyl group,
(to be referred to as CICA-R).

In the above formula, the alkyl group may either be straight or branched, and preferably has 1 to 6 carbon atoms. Examples of the alkyl group are methyl, ethyl, n- or iso-propyl, n-, iso- or tert.-butyl, n-, iso- or neo-pentyl, and n-hexyl. The methyl and ethyl groups are especially suitable.

Suitable compounds of the formula I include, for example, methyl 4-cyanoimidazole-5-carbamate, ethyl 4-cyanoimidazole-5-carbamate, n-propyl 4-cyanoimidazole-5-carbamate, isopropyl 4-cyanoimidazole-5-carbamate, and n-butyl 4-cyanoimidazole-5-carbamate. Of these, the methyl and ethyl 4-cyanoimidazole-5-carbamates are especially preferred because methanol and ethanol well dissolve 4-cyanoimidazole-5-carboxamide.

The novel CICA-R provided by this invention exhibits excellent pharmacological action on liver troubles, especially on fatty liver, in oral administration, and is useful as a medicine for treating liver troubles. Moreover, it is of commercial importance as intermediates for synthesizing 5-aminoimidazole-4-carbonitrile (to be referred to as AICN) of the formula

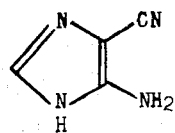

and 5-aminoimidazole-4-carboxamide (to be referred to as AICA) of the following formula

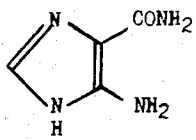

AICN of formula II and AICA of formula III are starting materials of commercial importance for the synthesis of purine compounds such as adenine, isoguanine, hypoxanthine, xanthine or guanine that are materials for preparing various medicines, agricultural chemicals, and seasonings, etc. AICA per se is an interesting compound as a cultivating agent for microorganisms, and a medicine for treating the functional troubles of liver. Various methods for their synthesis have previously been proposed. Known methods for synthesizing AICN include, for example, a method comprising subjecting diaminomaleonitrile to the irradation of light of wavelengths 300 to 340 mμ(Japanese Patent No. 608,710), and a method in which 4-cyanoimidazole-5-carboxamide is subjected in aqueous solution to the Hoffmann reaction (Japanese Patent No. 501,674). The former can give AICN in a yield of about 70%, but the photochemical reaction cannot be performed advantageously on a commercial scale. The latter is not commercially satisfactory because of the low yield of AICN.

Known methods for synthesizing AICA include, for example, (1) a method comprising catalytically reducing 4-nitroimidazole-5-carboxamide [Windaus, A and Langenbeck, W., Chem. Ber., 56 683 (1923)], (2) a method comprising reducing phenylazomalonamidine in formic acie to cyclize it [Montgomery, J. M., Newson, K., and Shealy, Y. F., J. Org. Chem., 24, 256 (1959)], (3) a method involving reacting 2-amino-2-amidinoacetamide dihydrochloride with an orthoformic acid ester (Japanese Patent 468,116), and (4) a method involving hydrolyzing AICN in an alkaline aqueous solution (Japanese Patent No. 501,680).

The methods (1) to (3) require a multiplicity of complicated steps for the synthesis of starting compounds, and the yield of the intended AICA is low. According to the method (4), it is necessary to carry out the reaction for several hours at 100° to 150°C. using a sealed pressure reactor. Thus, it involves the complexity of operation and danger. Furthermore, it has the defect that the desired AICA is difficult to separate from the reaction mixture by a simple procedure, and a complicated and time-consuming separating procedure is required.

We have now found that AICN and AICA of high purity can be prepared in good yields by a simple procedure of hydrolyzing the CICA-R of the formula I.

According to this invention, CICA-R of the formula I can be prepared by a process which comprises treating 4-cyanoimidazole-5-carboxamide of the formula IV (to be referred to as CICA)

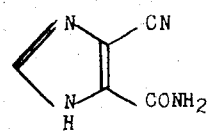

with a halogenating agent and an alkali in an alcohol of the formula $$ROH$$

V wherein R is the same as defined above.

According to this method, the cyano group at the 4-position in formula IV undergoes no change, but the carboxamide group at the 5-position reacts selectively and can be converted to a carbamate group. It is well known that carbamate ester groups are hydrolyzed easily in the presence of alkali to be converted to amino groups. In the case of CICA-R of this invention, the intended CICA-R can be isolated stably even if the reaction is carried out in an alcohol containing a small amount of water.

Preferred alcohols of formula V are those containing 1 to 6 carbon atoms. Examples of such alcohols are methanol, ethanol, n- or iso-propanol, n-, iso- or tert.-butanol, n-pentanol, and n-hexanol. Methanol and ethanol are especially suitable for commercial operation. The alcohols are preferably anhydrous, but those containing up to 40% of water can be used. However, since the yield of ClCA-R decreases with increasing water content, the water content of the alcohol should be as small as possible. Preferably, the water content of the alcohol is not more than 15% by weight.

Any halogenating agents generally used for halogenation of organic compounds can be used in this invention. Examples of suitable halogenating agents are halogen elements such as chlorine or bromine, hypohalous acid salts such as sodium hypochlorite, potassium hypochlorite, sodium hypobromite, or potassium hypobromite, and hypohalous acids such as hypochlorous acid, or hypobromous acid.

The alkali used in this invention may, for example, be alkali metals such as sodium or potassium, alkaline earth metals such as calcium or magnesium, alkali metal or alkaline earth metal hydroxides such as sodium hydroxide, potassium hydroxide or calcium hydroxide, or alkali metal or alkaline earth metal carbonates such as sodium carbonate, calcium carbonate or magnesium carbonate.

The reaction can be performed by bringing CICA, the halogenating agent and the alkali into contact with one another in the alcohol. The order of adding these compounds is not critical. For example, CICA is first added to the alcohol containing the alkali dissolved therein, followed by adding the halogenating agent. It is also possible to add the halogenating agent to the alcohol having the alkali dissolved therein, and then add CICA. Alternatively, an alcohol solution of CICA containing the alkali may be contacted with an aqueous solution of the halogenating agent.

The amount of the alcohol should be at least equimolar to CICA, and preferably in excess of CICA in order to make it function as a solvent. The amounts of the halogenating agent and the alkali can be 1 to 5 molar times, and 2 to 20 molar times, respectively, based on CICA, preferably 1.2 to 2 molar times, and 2.5 to 5 molar times, respectively. If the amounts of the halogenating agent and the alkali are too small, the reaction is slow, and on the other hand, too large amounts result in a tendency toward the decreasing of the selectivity to CICA-R.

The reaction temperature and the reaction time are not critical, but can be varied over wide ranges according to the alcohol, halogenating agent and alkali used. Generally, the reaction can be performed at −10° to +30°C., preferably −5° to +5°C. for a period of 0.1 to 5 hours, preferably 0.5 to 1.5 hours. In order to complete the reaction, it is often preferred to heat the reaction mixture after the above reaction, for 0.1 to 5 hours, usually 0.25 to 2 hours at the reflux temperature.

The reaction mixture obtained can be used as such for a subsequent reaction, or CICA-R can be isolated from it.

Isolation of CICA-R from the reaction mixture can be performed in accordance with a conventional procedure. For example, the reaction mixture is neutralized with a mineral acid such as hydrochloric acid, and evaporated to dryness. The evaporation residue is extracted with an alcohol such as ethanol, and the extract is again evaporated to dryness, after which the residue is recrystallized from water, for example.

Thus, CICA-R of high purity is obtained usually in a yield as high as more than 80%. This product can be directly used as a medicine as stated above, or can be used for preparing AICN and AICA which are very important as materials for synthesizing purine compounds.

We have found that the novel CICA-R of this invention as obtained in the above-described manner can be converted to AICN and AICA of high purity usually in a yield of as high as more than 90% simply by hydrolyzing it, and that by varying the hydrolyzing conditions, only one of AICN and AICA can be selectively prepared. Specifically, it has been found that hydrolysis of CICA-R in water or an aqueous solution containing an aliphatic alcohol with 1 to 4 carbon atoms in a concentration of not more than 50% by weight affords AICN in a yield as high as more than 90%.

According to another aspect of this invention, therefore, there is provided a process for preparing 5-aminoimidazole-4-carbonitrile (AICN) of the formula

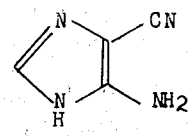
II which comprises hydrolyzing an alkyl 4-cyanoimidazole-5-carbamate (CICA-R) of the formula

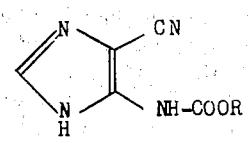
I wherein R is the same as defined above,
in the presence of an alkali in water or an aqueous solution containing an aliphatic alcohol with 1 to 4 carbon atoms in a concentration of not more than 50% by weight.

The above hydrolysis can be performed in water, and if desired in an aqueous solution containing an aliphatic alcohol with 1 to 4 carbon atoms, such as methanol, ethanol, n- or iso-propanol, or n-, iso- or tert.-butanol, preferably the methanol and ethanol, in a concentration of not more than 50% by weight, preferably not more than 30% by weight. Generally, aqueous solutions having a lower alcohol content give higher yields.

When hydrolysis is carried out subsequent to the preparation of CICA-R, it is not altogether necessary to isolate CICA-R from the resulting reaction mixture, but the reaction mixture as obtained can be hydrolyzed under the above-mentioned conditions by addition of an alkali and a required amount of water or an aqueous solution containing the aliphatic alcohol.

The alkali used as a hydrolyzing catalyst may be those which are used in ordinary hydrolysis, such as alkali metal or alkaline earth metal hydroxides or carbonates, such as sodium hydroxide, potassium hydroxide, sodium carbonate or calcium carbonate. The amount of the alkali used can be varied according to the type of CICA-R or the hydrolyzing conditions. It is advantageous, however, that the alkali is added in an amount 1.2 to 7 molar times, preferably 1.5 to 4 molar times, the amount of CICA-R and in a proportion such that the alkali concentration of the reaction mixture is 0.1 to 9 N, preferably 0.5 to 5 N.

The hydrolysis reaction proceeds even at room temperature, but the suitable hydrolyzing temperature is 50° to 100°C., preferably 70° to 100°C. Preferably, the reaction is carried out for a period of 0.5 to 3 hours, usually 0.5 to 2 hours. If the reaction is carried out at a higher temperature and/or for a longer period of time, AICA with the hydrolyzed cyano group at the 4-position also occurs. For example, if the alkali hydrolysis is carried out at 70°C. for 3 to 10 hours, AICA is formed as a principal product.

Separation of AICN from the reaction mixture consisting mainly of AICN can be effected by a customary procedure. For example, the reaction mixture is brought into contact with a cation-exchange resin of the hydrogen ion type to cause AICN to be adsorbed onto the resin. The resin is washed with water, and then eluted with Aqueous ammonia. The eluate is dried at reduced pressure, and the dried residue is decolorized with activated carbon and recrystallized from water to afford colorless crystals of AICN.

We have also found that AICA of very high purity can be isolated in the form of hydrochloride by neutralizing the reaction mixture containing AICA as a main product, with hydrochloric acid or sulfuric acid, removing the solvent (for example, by drying), extracting the dried solid with a lower aliphatic alcohol such as methanol, ethanol, propanol or butanol, and blowing a dried hydrogen chloride gas into the extract thereby to precipitate the hydrochloride of AICA. At this time, the by-product AICN is also converted to its hydrochloride. But since it is soluble in alcohol, the AICN hydrochloride can be separated from the AICA hydrochloride. When AICA is separated from the reaction mixture containing AICA as a main product, there can also be effectively used a method which comprises evaporating the reaction mixture to dryness, extracting it with an alcohol by heating it with stirring at 65° to 90°C. for 0.5 to 2 hours, removing the insoluble inorganic salts, if desired decolorizing the extract with activated carbon, and blowing a dried hydrogen chloride gas into the extract thereby to precipitate the hydrochloride of AICA. The alcohol used is a lower aliphatic alcohol containing 1 to 6 carbon atoms. Methanol, ethanol, n-propanol, and iso-propanol are preferred because of their good solubilizing power for AICA. The amount of the alcohol varies according to the type of the alcohol. For example, it is 10 to 20 parts for methanol, 20 to 30 parts for ethanol, and 50 to 100 parts for propanol, all per part of ACIA.

This method makes it possible to isolate AICA hydrochloride in a purity of as high as about 97 to 98%, and it is commercially very valuable as a material for preparing medicines which require high purity. The AICA hydrochloride can be directly used as a material for synthesizing medicines, agricultural chemicals, and seasonings, etc. It is also possible to prepare an aqueous solution of the AICA hydrochloride, and neutralize it with an alkali such as ammonia to convert it to free AICA.

It has also been found that when the CICA-R of this invention is hydrolyzed with hydrochloric acid, AICA can be obtained in a yield of more than 90%, and it is easy to separate AICA from the resultant reaction mixture.

This acid hydrolysis can be performed in the presence of hydrochloric acid in water or an aqueous solution containing at least 60% of a lower aliphatic alcohol such as methanol or ethanol. The reaction is performed at 30° to 150°C., preferably 50° to 108°C. The reaction time differs according to the reaction temperature, but is usually 5 to 60 minutes. When the reaction temperature is 50° to 108°C., a period of 5 to 60 minutes suffices. The concentration of hydrochloric acid in aqueous solution is suitably at least 30%, preferably 34 to 36%, and it is advantageous that the amount of CICA-R in the aqueous solution is 10 to 25%, preferably 15 to 20%.

The separation and recovery of AICA hydrochloride from the reaction mixture are very easy since cooling of the reaction mixture after the reaction results in the precipitation of crude crystals of AICA hydrochloride. Because of the ease of separation and recovery of AICA hydrochloride, the acid hydrolyzing method for CICA-R is very advantageous in commercial operation.

The crude AICA hydrochloride can be purified by a customary procedure. For example, high purity AICA hydrochloride can be obtained even by washing the crude AICA hydrochloride with a solvent that does not dissolve the AICA hydrochloride, for example, an alcohol such as ethanol. Furthermore, the AICA hydrochloride can be quantitatively converted to free AICA by neutralization with an alkali such as ammonia.

The following Examples illustrate the present invention in greater detail.

EXAMPLE 1

Metallic sodium (2.6 g) was dissolved in 40 ml. of methanol. The solution was cooled to 0°C., and 2.04 g of CICA was added. After CICA was completely dissolved, 2.4 g of bromine was added dropwise with vigorous stirring. During this time, the reaction temperature was maintained at 0° to 2°C. After the addition of bromine, the reaction mixture was further stirred at 0° to 2°C. for 30 minutes, and then immediately placed in a water bath heated at 80°C., followed by refluxing for 30 minutes. 3N hydrochloric acid was added to the reaction mixture to neutralize it, and the mixture was evaporated to dryness at reduced pressure using a rotary evaporator. The residue was extracted with 300 ml. of ethanol. The extract was again evaporated to dryness, and the resulting solid was recrystallized from water to afford 2.05 g (yield 82.3%) of methyl 4-cyanoimidazole-5-carbamate (CICA-Me) as colorless crystals having a melting point of above 300°C. The elemental analysis values of the crystals were as follows:

Found: C 43.35%; H 3.60%; N 33.80%; Calculated: C 43.38%; H 3.64%; N 33.72%

In the infrared absorption spectrum of these crystals, absorption spectra of bonds corresponding to the following appeared.

C≡N 2230 cm⁻¹
—N—H 3340 cm⁻¹ 3200 cm⁻¹
—C=O 1705 cm⁻¹

The following absorption appeared in the ultraviolet absorption spectrum of these crystals.

$\lambda_{max}^{PH4}$ 250 mμ

In the NMR of these crystals, peaks appeared at the following positions.

10.2 ppm, 7.6 ppm, 3.7 ppm, 3.4 ppm

When these crystals were subjected to paper chromatography using a developing solution consisting of n-butanol, water and acid in a ratio of 4:1:1, they were found to have an $R_f$ of 0.81.

EXAMPLE 2

Potassium hydroxide (2 g) and 2.04 g of CICA were dissolved in 200 ml. of methanol, and while the reaction temperature was maintained at 0°C., 21 ml. of a 10% aqueous solution of sodium hypochlorite was added dropwise. After the addition, the reaction mixture was stirred at 0°C. for an additional 30 minutes, and then immediately placed in a water bath heated at 80°C., followed by refluxing for 20 minutes. The reaction mixture was subjected to the same separating procedure as in Example 1 to afford 2.01 g (yield 80.7%) of CICA-Me.

EXAMPLE 3

Methanol (10 ml.) and 0.5 g of sodium hydroxide were added to 10 ml. of a 10% aqueous solution of sodium hypochlorite. The mixture was maintained at 0°C. with vigorous stirring, and a solution of 1.00 g of CICA and 0.5 g of sodium hydroxide in 80 ml. of methanol was added dropwise. After the addition, the reaction mixture was stirred at 0°C. for an additional 30 minutes, and then refluxed at an elevated temperature for 30 minutes. The reaction mixture was subjected to the same separating procedure as in Example 1 to afford 0.92 g (yield 75.4%) of CICA-Me.

EXAMPLE 4

Metallic sodium (2.6g) was dissolved in 100 ml. of n-butanol. The solution was cooled to 0°C., and 2.04 g of CICA was added. After CICA was completely dissolved, 2.4 g of bromine was added dropwise with vigorous stirring. During this time, the reaction temperature was maintained at 0°C. After the addition of bromine, the reaction mixture was stirred at 0° to 2°C. for an additional 30 minutes, and then heated at 90°C. for 30 minutes. the reaction mixture was subjected to the same separating procedure as in Example 1 to afford 14 g (yield 68.6%) of butyl 4-cyanoimidazole-5-carbamate (CICA-Bu) having a melting point of more than 300°C. The elemental analysis values of the product were as follows:

Found: C 51.86%; H 5.80%; N 26.96%; Calculated: C 51.92%; H 5.81%; N 26.91%

Infrared absorption spectrum:

C≡N 2230 cm⁻¹
—N—H 3338 cm⁻¹, 3200 cm⁻¹
—C=O 1703 cm⁻¹

Ultraviolet absorption spectrum:

λ max 251 mμ

EXAMPLE 5

Water (50 ml) was added to 250 ml. of ethanol, and 5 g of potassium hydroxide and 2.04 g of CICA were dissolved in the resulting mixture. With vigorous stirring, a solution of 2.4 g of bromine in 20 ml. of ethanol was added dropwise to the reaction mixture over a period of 20 minutes. During this time, the reaction temperature was maintained at −1°C. to 2°C. After the addition, the reaction mixture was further stirred at 0°C. for 20 minutes, and in the course of 1 hour, the temperature of the reaction mixture was raised to the reflux temperature, at which the reaction mixture was refluxed for 15 minutes. The same treatment of the reaction mixture as in Example 1 afforded 1.69 g (62.6%) of ethyl 4-cyanoimidazole-5-carbamate (CICA-Et) having a melting point of above 300°C. The elemental analysis values of this product were as follows:

Found: C 46.70%; H 4.50%; N 31.06%; Calculated: C 46.67%; H 4.48%; N 31.10%

Infrared absorption spectrum:

C≡N 2230 cm⁻¹
—N—H 3400 cm⁻¹ 3200 cm⁻¹
—C=O 1703 cm⁻¹

Ultraviolet absorption spectrum:

λ max 250 mμ

EXAMPLE 6

Metallic sodium (1.32 g) was dissolved in 200 ml. of iso-propyl alcohol. The solution was cooled to 0°C., and 2 g of CICA was added. The temperature of the solution was maintained at −1°C., and 1.66 g of dry gas was blown with vigorous stirring over the course of 30 minutes. The reaction mixture was stirred at −1°C. to 1°C. for 30 minutes, and then heated for 20 minutes at the reflux temperature. One gram of NH₄Cl was added to the reaction mixture, and the mixture was evaporated to dryness at reduced pressure.

The resulting solid was re-crystallized from 200 ml. of water to afford 2.18 g (yield 76.3%) of CICA-isopropyl which had a melting point of above 300°C.

The elemental analysis values of this product were as follows:

Found: C 46.70%; H 4.50%; N 31.06%; Calculated: C 46.67%; H 4.48%; N 31.10%

Infrared absorption spectrum:

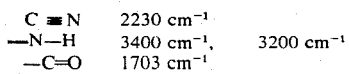

Ultraviolet absorption spectrum:

$\lambda$ max 250 m$\mu$

EXAMPLE 7

CICA-Me (2.00 g) was dissolved in 10 ml. of a 6N aqueous solution of sodium hydroxide, and the solution was heated at 100°C. for 1 hour. The reaction mixture was passed through a column packed with Amberlite IR-120 [H$^+$] (ion exchange resin). Then, the resin was thoroughly washed with deionized water, and then 3N aqueous ammonia was passed through the column. The resulting eluate was concentrated at reduced pressure, decolorized with activated carbon, and then recrystallized from water to afford colorless crystals having a melting point of 129°C. The elemental analysis values of the crystals were as follows and corresponded to those of AICN.

Found: C 44.40%; H 3.84%; N 51.7%; Calculated: C 44.44%; H 3.73%; N 51.83%

The amount of the crystals obtained was 1.19 g and the yield was 91.7%.

EXAMPLE 8

CICA-Et (2.0 g) was dissolved in 10 ml. of a 6N aqueous solution of sodium hydroxide, and the solution was heated at 100°C. for 1 hour. The reaction mixture was treated in the same way as in Example 7 to afford 1.05 g (yield 87.5%) of AICN.

EXAMPLE 9

CICA-Bu (1.50 g) was added to a solution consisting of 2 g of potassium hydroxide, 10 ml. of methanol and 10 ml. of water, and the solution was heated at 70°C. for 2 hours. The reaction mixture was treated in the same way as Example 7 to afford 0.608 g (yield 78.4%) of AICN.

EXAMPLE 10

In accordance with the procedure of Example 7, 2.0 g of CICA-Et was dissolved in 20 ml. of a 3N aqueous solution of sodium hydroxide, and the solution was heated at 100°C. for the period of time indicated in Table 1 below. Then, AICN was separated from each of the resulting reaction mixtures in the same way as in Example 7. The results are shown in Table 1.

Table 1

| Runs | Reaction time (hours) | Yield (%) |
| --- | --- | --- |
| 1 | 0.5 | 56 |
| 2 | 1.5 | 82 |
| 3 | 2.5 | 62 |

EXAMPLE 11

Bromine (2.4 g) was added to a mixture consisting of 40 ml. of methanol, 2.6 g of metallic sodium and 2.04 g of CICA while maintaining the temperature at 0°C. The mixture was then heated under reflux for 30 minutes to form CICA-Me.

Sodium hydroxide (1 g) and 50 ml. of water were added to the reaction mixture obtained, and the mixture was heated at 68°C. for 3 hours. The reaction mixture was subjected to the same separating procedure as in Example 7 to afford 1.16 g of AICN (yield based on CICA 71.6%).

EXAMPLE 12

CICA (2 g) and 1.32 g of metallic sodium were dissolved in 100 ml. of methanol, and with stirring, 1.66 g of chlorine gas was blown into the solution over the course of 30 minutes. During this time, the temperature of the solution was maintained at 0° to 2°C. After the introduction of chlorine gas, the reaction mixture was stirred for an additional 30 minutes, and heated for 15 minutes at the reflux temperature to form CICA-methyl. A 12N aqueous solution of sodium hydroxide (50 ml.) was added to the reaction mixture, and the mixture was refluxed for 9 hours and cooled, followed by neutralization with concentrated hydrochloric acid and evaporation to dryness at reduced pressure. The residue was extracted with 100 ml. of hot ethanol, and a dry hydrogen chloride gas was blown into the extract to afford AICA hydrochloride in an amount of 1.81 g (yield 75.7%) which had a melting point of 255.5°C.

EXAMPLE 13

CICA-Me (2.00 g) was added to 10 ml. of a 36% aqueous solution of hydrochloric acid, and the solution was heated at 95°C. for 20 minutes. CICA-Me was completely dissolved after 2 minutes from the heating, and the reaction mixture assumed a slight yellow color and was transparent. After the reaction, the reaction mixture was placed in a refrigerator, and the precipitated crystals were separated by filtration. The crystals obtained were washed with ethanol, and dried to afford colorless crystals having a melting point of 255.0°C. The elemental analysis values of the crystals were as follows and corresponded with those of AICA hydrochloride.

Found: C 29.40%; H 4.38%; N 34.59%; Calculated: C 29.55%; H 4.34%; N 34.46%

The amount of the AICA hydrochloride obtained was 1.72 g (yield 88.2%).

To 1 g of the AICA hydrochloride was added 4 ml. of 3N aqueous ammonia. The reaction mixture was concentrated at reduced pressure to form 0.755 g (yield 97.4%) of crude crystals of AICA. A part of the crystals was recrystallized from water to form colorless crystals having a melting point of 169°C. The elemental analysis values of the crystals were as follows, and corresponded to those of AICA.

Found: C 38.02%; H 4.76%; N 44.48%; Calculated: C 38.09%; H 4.80%; N 44.43%

EXAMPLE 14

CICA-Et (2.00 g) was added to 10 ml. of a 36% aqueous solution of hydrochloric acid, and the solution was heated at 60°C. for 50 minutes. After 7 minutes from the heating, the CICA-Et was completely dissolved. The reaction mixture became slightly yellow and transparent. After the reaction, the reaction mixture was subjected to the same separating procedure as in Example 13 to afford 1.52 g (yield 84.1%) of AICA hydrochloride having a melting point of 254.5°C.

EXAMPLE 15

CICA-Bt (1.50 g) was added to 10 ml. of a 36% aqueous solution of hydrochloric acid, and the solution was heated at 100°C. for 15 minutes. In 2 minutes after the heating, CICA-Bt was completely dissolved, and the reaction mixture became slightly yellow and transparent. After the reaction, the reaction mixture was subjected to the same separating procedure as in Example 13 to afford 0.930 g (yield 79.8%) of AICA hydrochloride having a melting point of 254.5°C.

EXAMPLE 16

In accordance with the procedure of Example 13, CICA-Me was added to 10 ml. of a 36% aqueous solution of hydrochloric acid, and the solution was heated at 100°C. for the period of time indicated in Table 2. After the reaction, AICA hydrochloride was separated from the reaction mixture in the same way as in Example 13. The results are shown in Table 2.

Table 2

| Runs | Reaction time (minutes) | Yield (%) |
|---|---|---|
| 1 | 5 | 66.1 |
| 2 | 15 | 85.2 |
| 3 | 25 | 75.7 |

What is claimed is:
1. An alkyl 4-cyanoimidazole-5-carbamate of the formula

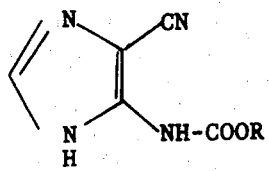

wherein R is a lower alkyl group containing 1 to 6 carbon atoms.

2. The compound of claim 1 which is methyl 4-cyanoimidazole-5-carbamate.
3. The compound of claim 1 which is ethyl 4-cyanoimidazole-5-carbamate.
4. The compound of claim 1 which is butyl 4-cyanoimidazole-5-carbamate.
5. The compound of claim 1 which is propyl 4-cyanoimidazole-5-carbamate.
6. A process for preparing an alkyl 4-cyanoimidazole-5-carbamate of the formula

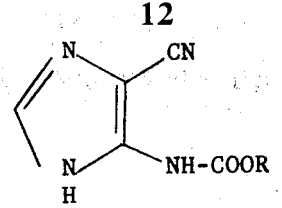

wherein R is a lower alkyl group containing 1 to 6 carbon atoms,
which comprises treating 4-cyanoimidazole-5-carboxamide of the formula

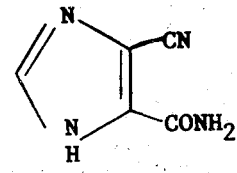

with a halogenating agent and an alkali in an alcohol of the formula

ROH wherein R is the same as defined above.

7. The process of claim 6 wherein said alcohol is methanol, ethanol, propanol, or butanol.
8. The process of claim 6 wherein said alcohol is anhydrous.
9. The process of claim 6 wherein said alcohol is a water-containing alcohol having a water content of up to 40% by weight.
10. The process of claim 6 wherein said halogenating agent is chlorine, bromine, sodium hypochlorite, potassium hypochlorite, sodium hypobromite or potassium hypobromite.
11. The process of claim 6 wherein said alkali is sodium, sodium hydroxide, potassium hydroxide, sodium carbonate, or calcium carbonate.
12. The process of claim 6 wherein said reaction is carried out at a temperature of −5°C. to 5°C.
13. A process for preparing 5-aminoimidazole-4-carbonitrile of the formula

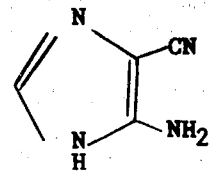

which comprises hydrolizing an alkyl 4-cyanoimidazole-5-carbamate of the formula

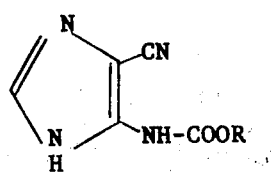

wherein R is a lower alkyl group containing 1 to 6 carbon atoms;
in the presence of an alkali in a concentration of 0.1 to 9N in water or in an aqueous solution containing an aliphatic alcohol with 1 to 4 carbon atoms in a concentration of not more than 50% by weight at a temperature of 50° to 100°C for 0.5 to 3 hours.

14. The process of claim 13 wherein said alkali is sodium hydroxide, potassiumhydroxide, sodium carbonate or calcium carbonate.

15. A process for preparing 5-aminoimidazole-4-carbonitrile of the formula

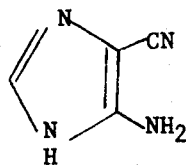

which comprises treating 4-cyanoimidazole-5-carboxamide of the formula

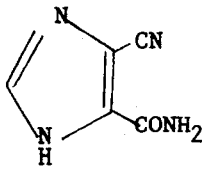

with a halogenating agent and an alkali in an alcohol of the formula

ROH wherein R is a lower alkyl group of 1 to 6 carbon atoms, and
hydrolyzing the resulting mixture in the presence of an alkali in water or in an aqueous solution containing up to 50% by weight of an aliphatic alcohol with 1 to 4 carbon atoms.

16. The process of claim 15 wherein said alcohol is methanol, ethanol, propanol, or butanol.

17. The process of claim 15 wherein said alcohol is anhydrous.

18. The process of claim 15 wherein said alcohol is a water-containing alcohol having a water content of up to 40% by weight.

19. The process of claim 15 wherein said halogenating agent is chlorine, bromine, sodium hypochlorite, potassium hypochlorite, sodium hypobromite or potassium hypobromite.

20. The process of claim 15 wherein said alkali is sodium, sodium hydroxide, potassium hydroxide, sodium carbonate, or calcium carbonate.

21. The process of claim 15 wherein said treatment is carried out at a temperature of −5°C to 5°C.

22. The process of claim 15 wherein the concentration of the alkali is 0.1 to 9 N.

23. The process of claim 15 wherein the hydrolysis is carried out at 50 to 100°C for 0.5 to 3 hours.

24. A process for preparing pure 5-aminoimidazole-4-carboxamide hydrochloride of the formula

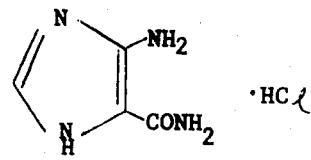

which comprises
a. hydrolyzing an alkyl 4-cyanimidazole-5-carbamate of the formula

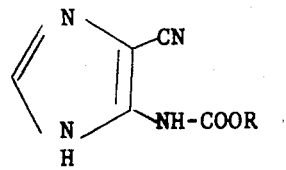

wherein R is a lower alkyl group containing 1 to 6 carbon atoms,
in the presence of an alkali in a concentration of 0.1 to 9N in water or an aqueous solution containing up to 50% by weight of an aliphatic alcohol having 1 to 4 carbon atoms, at a temperature of 50° to 100°C for 0.5 to 10 hours;
b. neutralizing the resulting reaction mixture with hydrochloric acid or sulfuric acid;
c. removing the solvent;
d. extracting the resulting 5-aminoimidazole-4-carboxamide with a lower aliphatic alcohol at a temperature of 65 to 90°C;
e. blowing a dry hydrogen chloride gas into the extract thereby to precipitate 5-aminoimidazole-4-carboxamide hydrochloride; and
f. recovering the 5-aminoimidazole-3-carboxamide hydrochloride.

25. The process of claim 24 wherein said lower aliphatic alcohol is methanol, ethanol, propanol or butanol.

* * * * *